United States Patent
Mahmud et al.

(10) Patent No.: US 10,346,772 B2
(45) Date of Patent: Jul. 9, 2019

(54) DETERMINING GROUP ATTRIBUTES AND MATCHING TASKS TO A GROUP

(71) Applicant: International Business Machines Corporation, Armonk, NY (US)

(72) Inventors: Jalal U. Mahmud, San Jose, CA (US); Aditya Pal, San Jose, CA (US); Fei Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 14/300,342

(22) Filed: Jun. 10, 2014

(65) Prior Publication Data

US 2015/0356480 A1    Dec. 10, 2015

(51) Int. Cl.
*G06Q 10/06* (2012.01)
*G06Q 50/00* (2012.01)

(52) U.S. Cl.
CPC ....... *G06Q 10/06311* (2013.01); *G06Q 50/01* (2013.01)

(58) Field of Classification Search
CPC .................... G06Q 10/06311; G06Q 50/01
USPC ...................................................... 705/7.13
See application file for complete search history.

(56) References Cited

U.S. PATENT DOCUMENTS

| | | | |
|---|---|---|---|
| 8,353,012 B2 | 1/2013 | Del Real | |
| 2006/0025931 A1* | 2/2006 | Rosen | G16H 50/20 |
| | | | 702/19 |
| 2007/0208572 A1* | 9/2007 | Habichler | G06Q 10/063112 |
| | | | 705/7.14 |
| 2008/0126149 A1* | 5/2008 | Kloess | G06Q 10/00 |
| | | | 705/7.31 |
| 2008/0228767 A1 | 9/2008 | Kenedy et al. | |

(Continued)

FOREIGN PATENT DOCUMENTS

WO    2007103886 A2    9/2007

OTHER PUBLICATIONS

Chesta, Cristina / Siohan, Olivier / Lee, Chin-Hui (1999): "Maximum a posteriori linear regression for hidden Markov model adaptation", in EUROSPEECH'99, 211-214.*

(Continued)

*Primary Examiner* — Timothy Padot
*Assistant Examiner* — George H Walker, III
(74) *Attorney, Agent, or Firm* — Nicholas L. Cadmus; Jose A. Medina-Cruz; William H. Hartwell

(57) ABSTRACT

In a method for determining group attributes and matching tasks to a group, a plurality of individual attributes for members of a first group of a plurality of groups are determined, wherein each individual attribute has a type. Parameters of a first distribution of at least one type of individual attribute across members of the first group are estimated. Group attributes of the first group are determined based, at least in part, on the estimated parameters of the first distribution of at least one type of individual attribute. The determined group attributes of the first group are stored in a repository, wherein the repository includes group attributes associated with each group of the plurality of groups. A task is received, wherein the task is associated with a specific group attribute and the task is matched to one group of the plurality of groups based on the specific group attribute.

20 Claims, 3 Drawing Sheets

(56) References Cited

U.S. PATENT DOCUMENTS

| | | | |
|---|---|---|---|
| 2009/0006173 A1* | 1/2009 | Farrell | G06Q 10/06 705/7.13 |
| 2010/0057514 A1* | 3/2010 | Chee | G06Q 10/06 705/80 |
| 2011/0040764 A1* | 2/2011 | Duchon | G06Q 10/04 707/738 |
| 2011/0046924 A1* | 2/2011 | Natarajan | G06F 17/18 703/2 |
| 2013/0185097 A1* | 7/2013 | Saria | G06Q 10/00 705/3 |
| 2013/0197970 A1 | 8/2013 | Aaskov et al. | |
| 2013/0254152 A1* | 9/2013 | Zhang | G06N 99/005 706/52 |
| 2014/0142998 A1* | 5/2014 | Kroeger | G06Q 10/06311 705/7.13 |
| 2014/0207503 A1* | 7/2014 | Reis | G06Q 10/06311 705/7.13 |
| 2014/0375493 A1* | 12/2014 | Weisenburger | G01S 19/48 342/357.3 |

OTHER PUBLICATIONS

Chhabra M., Das S., Szymanski B. (2013) Team Formation in Social Networks. In: Gelenbe E., Lent R. (eds) Computer and Information Sciences III. 27th International Symposium on Computer and Information Sciences. Springer, London DOI https://doi.org/10.1007/978-1-4471-4594-3_30.*

Ackerman, et al., "Expertise Networks in Online Communities: Structure and Algorithms", WWW 2007 Proceedings of the 16th International Conference on World Wide Web, May 8-12, 2007, pp. 221-230.

Backstrom, et al., "Group Formation in Large Social Networks: Membership, Growth, and Evolution", KDD '06 Proceedings of the 12th ACM SIGKDD International Conference on Knowledge Discovery and Data Mining, pp. 44-54, 2006.

Bagozzi, et al., "A social influence model of consumer participation in network- and small-group-based virtual communities", International Journal of Research in Marketing, vol. 21(3), pp. 241-263, 2004.

Masthoff, Judith, "Group Recommender Systems: Combining individual models", <http://homepages.abdn.ac.uk/j.masthoff/pages/Publications/chGroup.pdf>.

"How to Group Objects Into Similar Categories, Cluster Analysis"; StatSoft; printed Dec. 11, 2013; <http://www.statsoft.com/Textbook/Cluster-Analysis>.

Wikipedia; "Machine Learning"; Printed Dec. 11, 2013; <http://en.wikipedia.org/wiki/Machine_learning>.

Wikipedia; "Mathematical optimization"; Printed Dec. 11, 2013; <http://en.wikipedia.org/wiki/Optimization_(mathematics)>.

Wikipedia; "Decision tree learning"; Printed Dec. 11, 2013; <http://en.wikipedia.org./wiki/Decision_tree_learning>.

Wikipedia; "Parametric model"; Printed Oct. 21, 2013; <http://en.wikipedia.org/wiki/Parametic_model>.

Wikipedia; "Maximum a posteriori estimation"; Printed Oct. 21, 2013; <http://en.wikipedia.org/wiki/Maximum_a_posteriori_estimation>.

Wikipedia; "Maximum likelihood"; Printed Oct. 21, 2014; <http://en.wikipedia.org/wiki/Maximum_likelihood>.

* cited by examiner

DETERMINING GROUP ATTRIBUTES AND MATCHING TASKS TO A GROUP

BACKGROUND

The present invention relates generally to aggregation software, and more particularly to using attributes of individuals to determine attributes of groups that include the individuals and matching tasks to a group based on the determined group attributes.

The tendency of people to come together and form groups is inherent in the structure of our society. The ways in which such groups take shape and evolve over time is a popular research topic in a variety of disciplines ranging from social sciences to computer science. A structured group, such as those on network websites and forums, includes a collection of members. Oftentimes, the members of a structured group share a common interest or attribute. For example, members of a baseball group on a social network website are most likely baseball fans. Structured groups may be separated into smaller groups called subgroups. For example, the baseball group may include subgroups. Each subgroup may represent a different baseball team.

Collection and analysis of individual member attributes, such as preferences, activities, and interests may be useful for network analysis. For example, a networking website may monitor the individual attributes of its members in order to better select advertisements and page suggestions to display for each member. In another example, individual attributes may be used to assign tasks to individuals within a network.

SUMMARY

Aspects of embodiments of the present invention disclose a method, computer program product, and computer system for determining group attributes and matching tasks to a group. The method includes determining a plurality of individual attributes for members of a first group of a plurality of groups, wherein each individual attribute of the plurality of individual attributes has a type. The method further includes one or more processors estimating one or more parameters of a first distribution of at least one type of individual attribute across members of the first group. The method further includes one or more processors determining one or more group attributes of the first group based, at least in part, on the one or more estimated parameters of the first distribution of at least one type of individual attribute. The method further includes storing the one or more determined group attributes of the first group in a repository, wherein the repository includes group attributes associated with each group of the plurality of groups, including the first group. The method further includes receiving a task, wherein the task is associated with a specific group attribute. The method further includes one or more processors matching the task to one group of the plurality of groups based on the specific group attribute.

DETAILED DESCRIPTION

The digital domain has seen significant growth in the scale and richness of online communities and social media through the increasing popularity of social networking sites. It may be advantageous for a networking site, or another entity, to collect and analyze individual attributes of its members. The members of networking sites may participate in forums and groups hosted by the networking site. Embodiments of the present invention recognize that simple aggregation techniques, such as min, mean, and median calculations do not adequately aggregate the attributes of groups to which members belong.

Figure 1:
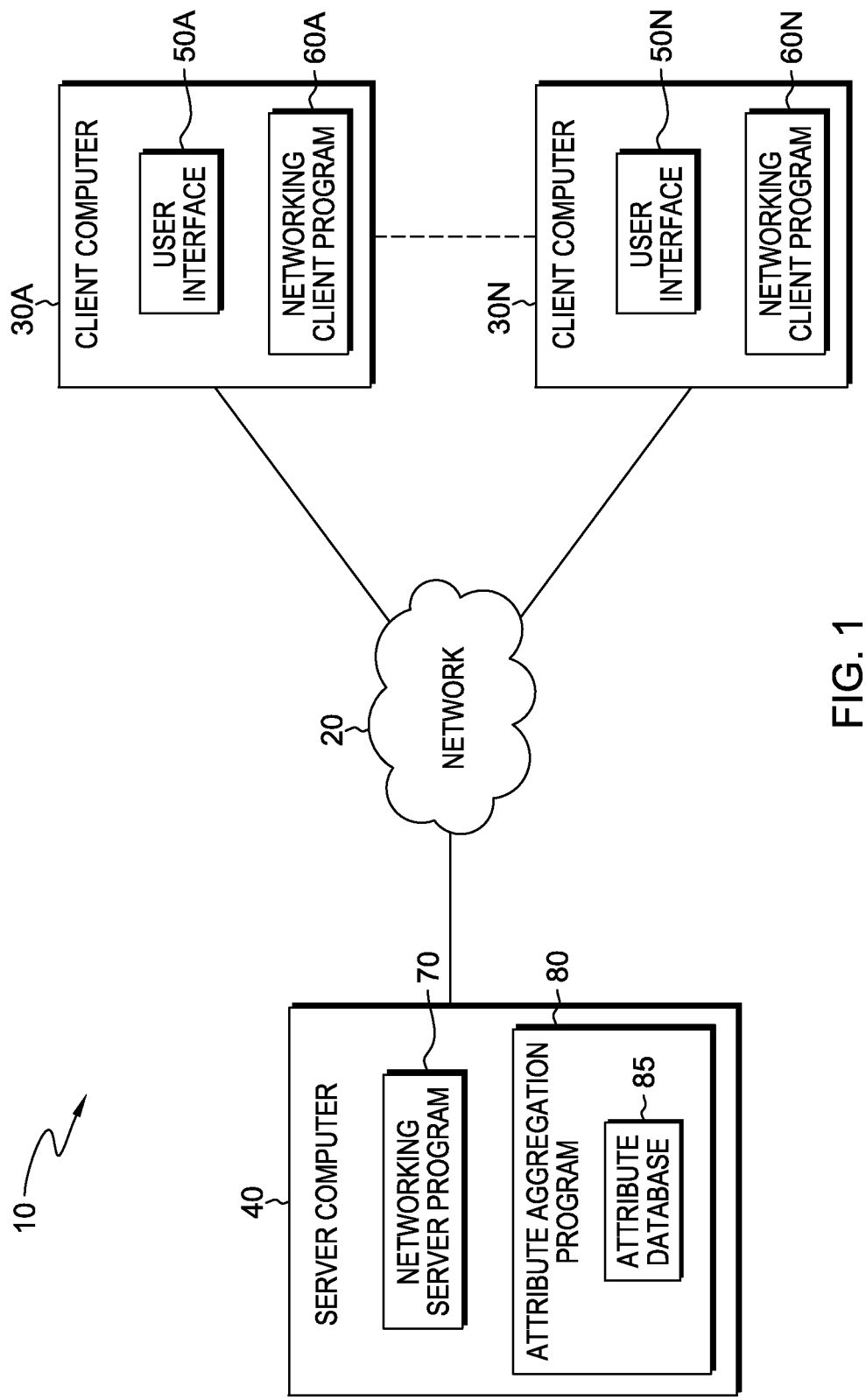
FIG. 1 is a functional block diagram illustrating a distributed data processing environment, in accordance with one embodiment of the present invention.

The present invention will now be described in detail with reference to the Figures. FIG. 1 depicts a diagram of distributed data processing environment 10 in accordance with one embodiment of the present invention. FIG. 1 provides only an illustration of one embodiment and does not imply any limitations with regard to the environments in which different embodiments may be implemented.

Distributed data processing environment 10 includes client computer 30A through client computer 30N (hereinafter "30A-N) and server computer 40 interconnected over network 20. Network 20 may be a local area network (LAN), a wide area network (WAN) such as the Internet, a combination of the two or any combination of connections and protocols that will support communications between client computers 30A-N and server computer 40 in accordance with embodiments of the present invention. Network 20 may include wired, wireless, or fiber optic connections. Distributed data processing environment 10 may include additional server computers, client computers, or other devices not shown.

Client computers 30A-N may each be a desktop computer, laptop computer, tablet computer, personal digital assistant (PDA), or smart phone. In general, computers 30A-N may each be any electronic device or computing system capable of sending and receiving data, and communicating with server computer 40 over network 20, in accordance with embodiments of the present invention. In the depicted embodiment, client computers 30A-N include user interface (UI) 50A through user interface 50N (hereinafter "50A-N") and networking client program 60A through networking client program 60N (hereinafter "60A-N"), respectively. In one embodiment, client computers 30A-N include components described in reference to FIG. 3.

Server computer 40 may be a management server, a web server, or any other electronic device or computing system capable of receiving and sending data. In the depicted embodiment, server computer 40 may represent a server computing system utilizing multiple computers as a server system, such as in a cloud computing environment. In the depicted embodiment, server computer 40 includes networking server program 70 and attribute aggregation program 80. In one embodiment, server computer 40 includes components described in reference to FIG. 3.

UI 50A-N each operate on client computers 30A-N, respectively, to visualize content, such as menus and icons, and to allow a user to interact with an application accessible to client computers 30A-N. In one embodiment, UI 50 A-N each comprise an interface to networking client programs 60A-N, respectively. For example, UI 50A-N may display data received by networking client programs 60A-N from networking server program 70 over network 20. In other embodiments, UI 50A-N may each comprise one or more interfaces such as an operating system interface and/or application interfaces.

Networking client programs 60A-N may each be a dedicated client network program, a web browser, or any other program that can communicate with networking server program 70 and provide a user interface for interacting with the networking website hosted by networking server program 70.

Networking server program 70 operates to host a networking service. In one embodiment, the networking service is a professional networking website that is a platform to connect members who work in similar fields and share similar professional goals. In another embodiment, the networking service is a social networking website that is a platform to connect members with similar interests and backgrounds. In yet another embodiment, a networking service is an internal networking service used by an organization for exclusive use by its members. The internal networking service could, for example, be a professional networking service that can only be accessed by employees of a specific company. In the depicted embodiment, only members of the networking service hosted by networking server program 70 can access the networking service. Each member of the networking service may send membership information to the networking service at the time that each member registers with the networking service and periodically after registration.

In one embodiment, membership information includes general information about each member of the networking service hosted by networking server program 70. For example, membership information includes each user's user identifier, or user id. In another example, membership information includes individual attributes about each member of the networking service. In another embodiment, individual attributes include personal information. For example, individual attributes include each member's real name and geographic location. In yet another embodiment, individual attributes include professional information. For example, individual attributes include each member's professional field, educational background, and professional interests.

In one embodiment, activity information includes information that is shared by a member of a networking site hosted by networking server program 70. For example, activity information shared by a member includes status updates, posts by each member, and information posted by other members to the member's profile. Individual attributes can be determined from such activity information. In another embodiment, activity information includes affiliations of each member. Activity information also includes groups and forums to which each member belongs as well as information shared by each member with the groups and forums.

In the depicted embodiment, a plurality of members of the networking service hosted by networking server program 70 at client computers 30A-N access networking client programs 60A-N, respectively. The members, using UI 50A-N, submit membership information and activity information to networking client programs 60A-N, respectively. Networking client programs 60A-N send the membership information and activity information to networking server program 70 over network 20. Networking server program 70 receives the membership information and activity information from network client programs 60A-N. In one embodiment, networking server program 70 stores the received membership information and activity information. In another embodiment, networking server program 70 sends membership information and activity information to attribute aggregation program 80.

Attribute aggregation program 80 operates to determine group attributes from received membership information and activity information. In one embodiment, attribute aggregation program 80 receives membership information and activity information for each member of the networking service from networking server program 70. Attribute aggregation program 80 determines individual attributes of each member of a pre-defined group within the networking service. A pre-defined group includes at least one member of the plurality of members of the networking service. In one embodiment, a pre-defined group is determined by networking server program 70. For example, a pre-defined group is an engineering forum hosted by the professional networking service. In one embodiment, attribute aggregation program 80 determines if the number of members in the pre-defined group exceeds a pre-defined threshold. For example, if the threshold is 200, attribute aggregation program 80 determines if the number of members in the pre-defined group is greater than 200. If the number of members in the group exceeds the pre-defined threshold, attribute aggregation program 80 assigns each member in the pre-defined group to a subgroup. A subgroup is a group that includes some members of the pre-defined group. The number of members in a subgroup is less than the number of members in a pre-defined group. Each subgroup includes members that share similar individual attributes. For example, each subgroup includes members who reside in the same city.

Attribute aggregation program determines the distribution of individual attributes within the pre-defined group. In one embodiment, attribute aggregation program 80 uses a common aggregation function to determine the distribution of the individual attributes within the pre-defined group. A common aggregation function measures min, mean, and median for each individual attribute within the pre-defined group. For example, attribute aggregation program 80 determines that the highest level of education obtained by members of the group is a doctoral degree. In another example, attribute aggregation program 80 determines that the average level of education achieved by members of the group is a bachelor's degree. In another embodiment, attribute aggregation program 80 uses a parametric model to estimate distribution parameters of the determined individual attributes.

Attribute aggregation program 80 estimates the parameters described by the distribution of individual attributes within the pre-defined group. For example, attribute aggregation program 80 determines that an individual attribute follows a normal (or Gaussian) distribution. Attribute aggregation program 80 determines the parameters associated with a normal distribution. For example, attribute aggregation program 80 determines the maximum and minimum of the Gaussian distribution of the individual attribute. Attribute aggregation program 80 applies the determined parameters (e.g. maximum and minimum) of the individual attribute to the pre-defined group. After applying the determined parameters, attribute aggregation program 80 determines a group attribute for the pre-defined group.

In one embodiment, attribute aggregation program 80 repeats this process for other individual attributes. For example, attribute aggregation program 80 determines the distribution of other individual attributes, such as expertise in programming languages, location, and employment history. Attribute aggregation program 80 determines the parameters associated with the distribution of each individual attribute (e.g. mean, median). Attribute aggregation program 80 then applies the determined parameters of each individual attribute to the pre-defined group in order to determine group attributes.

In another embodiment, attribute aggregation program 80 receives tasks from networking server program 70. For example, a task includes writing a program to perform a specific function. In another example, a task is a survey about specific software. In one embodiment, each received task is associated with a specific group attribute. For example, a task requires expertise in HTML programming.

In the depicted embodiment, attribute aggregation program 80 includes attribute database 85. In one embodiment, attribute aggregation program 80 stores determined group attributes, pre-defined group associated with stored group attributes, received tasks, and group attributes associated with tasks to attribute database 85.

Attribute database 85 is a repository that may be written and read by software on server computer 40 and is accessible to attribute aggregation program 80. In one embodiment, attribute database 85 is a component of attribute aggregation program 80 and is located on server computer 40. In other embodiments, attribute database 85 may be located on another system or another computing device within distributed data processing environment 10, provided that attribute database 85 is accessible to attribute aggregation program 80 via network 20. In one embodiment, attribute database 85 stores group attributes and pre-defined group associated with stored group attributes. In another embodiment, attribute database 85 stores received tasks and group attributes associated with tasks.

In one embodiment, attribute aggregation program 80 operates to match tasks to pre-defined groups. In one embodiment, attribute aggregation program 80 receives a task and a group attribute associated with the task from networking server program 70. Attribute aggregation program 80 accesses attribute database 85 and compares stored group attributes to the group attribute associated with the task. Attribute aggregation program 80 matches the group attribute associated with the task to a stored group attribute. Attribute aggregation program 80 matches the task with the pre-defined group associated with the stored attribute that matches the group attribute associated with the task. In one embodiment, attribute aggregation program 80 sends the task to the matched pre-defined group. In another embodiment, if attribute aggregation program 80 does not match the task to a pre-defined group, attribute aggregation program 80 stores the task to attribute database 85.

In yet another embodiment, after determining group attributes for a pre-defined group, attribute aggregation program 80 matches the pre-defined group with a stored task in attribute repository 85. Attribute aggregation program 80 accesses attribute repository 85. Attribute aggregation program 80 compares the determined group attributes to group attributes associated with stored tasks. Attribute aggregation program 80 determines that a determined group attribute matches a group attribute associated with a stored task. Attribute aggregation program 80 matches the stored task with the pre-defined group associated with the stored attribute that matches the group attribute associated with the stored task. In one embodiment, attribute aggregation program 80 sends the stored task to the matched pre-defined group. In another embodiment, if attribute aggregation program 80 does not match the pre-defined group with a task, attribute aggregation program 80 stores the pre-defined group and associated group attributes to attribute database 85.

Figure 2:
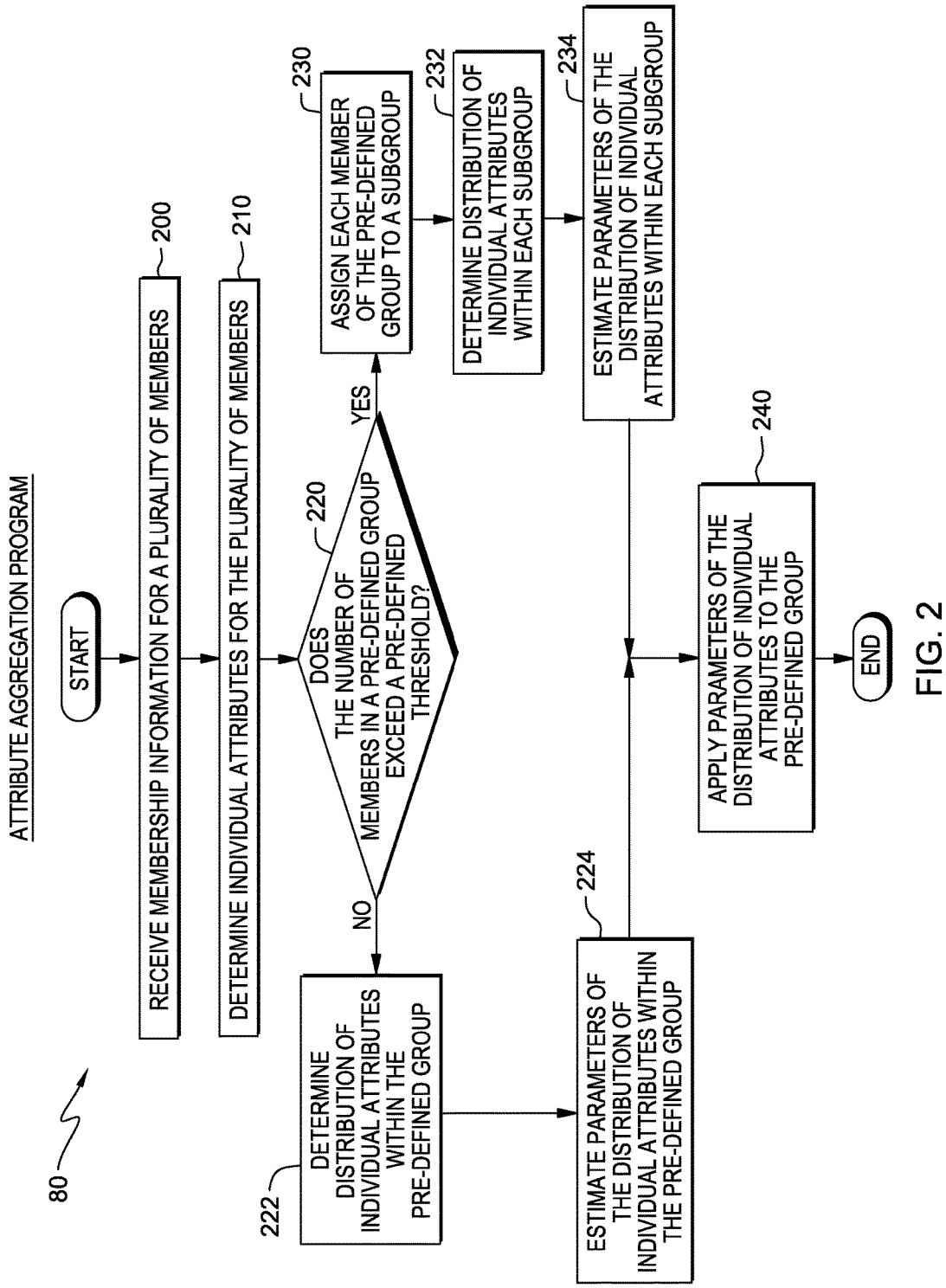
FIG. 2 is a flowchart depicting operational steps of an attribute aggregation program for determining group attributes and matching tasks to a group, executing within the environment of FIG. 1, in accordance with one embodiment of the present invention.

FIG. 2 is a flowchart depicting operation steps of attribute aggregation program 80 for estimating the distribution of individual and group attributes, in accordance with one embodiment of the present invention.

Initially, a plurality of members of a networking service hosted by networking server program 70 are at client computers 30A-N. The plurality of members each input membership information using UI 50A-N to access networking client programs 60A-N, respectively. In one embodiment, membership information includes individual attributes. Networking client programs 60A-N send the membership information for the plurality of members to networking server program 70 over network 20. In another embodiment, networking client programs 60A-N send the membership information for the plurality of members to attribute aggregation program 80 over network 20.

Networking server program 70 receives membership information for the plurality of members from networking client programs 60A-N. In one embodiment, networking server program 70 sends membership information for the plurality of members to attribute aggregation program 80.

In step 200, attribute aggregation program 80 receives membership information for a plurality of members from networking server program 70. In another embodiment, attribute aggregation program 80 receives membership information from networking client programs 60A-N.

In step 210, attribute aggregation program 80 determines individual attributes for the plurality of members. In one embodiment, the membership information received by attribute aggregation program 80 includes individual attributes. In one embodiment, attribute aggregation program 80 receives an indication from networking server program 70 that includes individual attributes for the plurality of members. The indication may be in the form of data that includes individual attributes for the plurality of members. In one embodiment, each individual attribute has a type. For example, a type of individual attribute is location. In another example, a type of individual attribute is professional field.

Attribute aggregation program 80 determines if the number of members in a pre-defined group exceeds a pre-defined threshold (decision 220). In one embodiment, networking server program 70 sends an indication to attribute aggregation program 80 that defines the pre-defined group. In another embodiment, network server program 70 sends an indication to attribute aggregation program 80 that defines a plurality of pre-defined groups within the networking service. Attribute aggregation program 80 compares the number of members in the pre-defined group to a pre-defined threshold. For example, the pre-defined threshold is 100. Attribute aggregation program 80 determines if the number of members in the pre-defined group is greater than or less than 100. If attribute aggregation program 80 determines that the number of members in the pre-defined group exceeds the pre-defined threshold, then attribute aggregation program 80 proceeds to step 230 (decision 220, Yes branch). If attribute aggregation program 80 determines that the number of members in the pre-defined group does not exceed the pre-defined threshold, then attribute aggregation program 80 proceeds to step 222 (decision 220, No branch).

In step 222, attribute aggregation program 80 determines distribution of individual attributes within the pre-defined group. In one embodiment, attribute aggregation program 80 uses a common aggregation function to determine the distribution of individual attributes within the pre-defined group. Common aggregation functions can include average, maximum, and minimum. In one embodiment, attribute aggregation program 80 uses average to determine the distribution of individual attributes within the pre-defined group. For example, attribute aggregation program 80 determines the average distribution of a skill level, such as C++ programming. Attribute aggregation program 80 determines that the average C++ programming skill level within the pre-defined group is "experienced."

In another embodiment, attribute aggregation program 80 uses maximum to determine the distribution of individual attributes of a member of the networking service. For example, attribute aggregation program 80 determines that the maximum C++ programming skill level within the pre-defined group is expert. In yet another embodiment, attribute aggregation program 80 uses minimum to determine the distribution of individual attributes of a member of the networking service. For example, attribute aggregation program 80 determines that the minimum C++ programming skill level within the pre-defined group is "beginner."

In another embodiment, attribute aggregation program 80 uses a parametric distribution model to estimate distribution parameters of individual attributes. A parametric distribution model assumes that the data has come from one type of probability distribution, such as Gaussian distribution.

In one embodiment, attribute aggregation program 80 estimates parameters of the distribution of each individual attribute within the group one at a time. In another embodiment, attribute aggregation program 80 uses multivariate normal distribution to generalize the distribution of all individual attributes within the group at the same time.

In one embodiment, attribute aggregation program 80 creates a histogram-based multivariate normal distribution of all of the individual attributes. A histogram is a graphical representation of the distribution of data. In such an embodiment, attribute aggregation program 80 uses the histogram to estimate parameters of the distribution of all of the individual attributes within the group.

In step 224, attribute aggregation program 80 estimates parameters of the distribution of individual attributes within the pre-defined group. In one embodiment, attribute aggregation program 80 determines parameters of the distribution of individual attributes within the pre-defined group by using maximum-likelihood estimation (MLE). MLE uses a statistical model based on the determined distribution of individual attributes within the pre-defined group. MLE estimates the function of the individual attributes within the group by calculating the probability that each individual trait will be observed, given the parameters of the statistical model. MLE maximizes the "agreement" between a statistical model and observed data (e.g. individual attributes within the group).

In another embodiment, attribute aggregation program 80 determines parameters of the distribution of individual attributes within the pre-defined group by using maximum-a-posteriori (MAP) probability. MAP is closely related to MLE. The difference between MAP and MLE is that MAP includes prior domain knowledge.

The parametric distribution model makes inferences about the parameters of the distribution. If parameters such as the mean and standard deviation of a set of data (e.g. individual attributes) are known and the distribution is Gaussian, attribute aggregation program 80 can use the determined distribution of individual attributes to predict the distribution of those attributes within the pre-defined group. For example, attribute aggregation program 80 determines that an individual attribute, such as level of education, follows a Gaussian distribution. Attribute aggregation program 80 determines the mean and standard deviation for level of education based on the determined Gaussian distribution of level of education. Attribute aggregation program 80 uses the determined mean and standard deviation to predict the distribution of level of education within the pre-defined group.

In step 230, attribute aggregation program 80 assigns each member of the pre-defined group to a subgroup. In one embodiment, attribute aggregation program 80 uses the individual attributes determined in step 210 to determine subgroups. For example, attribute aggregation program 80 assigns members to subgroups based on an area of expertise. In a pre-defined group that includes educators, attribute aggregation program 80 assigns each member of the pre-defined group to a subgroup based on the respective field of each educator. Such subgroups may include mathematics, science, literature, art, and history. In another example, attribute aggregation program 80 assigns each member to a subgroup based on the location of each member in the pre-defined group.

In step 232, attribute aggregation program 80 determines distribution of individual attributes within each subgroup. Attribute aggregation program 80 determines distribution of individual attributes within each subgroup in a manner similar to that described in step 222.

In step 234, attribute aggregation program 80 estimates parameters of the distribution of individual attributes within each subgroup. Attribute aggregation program 80 estimates parameters of the distribution of individual attributes within each subgroup in a manner similar to that described in step 224.

In step 240, attribute aggregation program 80 applies the parameters of the distribution of individual attributes to the pre-defined group. In one embodiment, attribute aggregation program 80 applies the parameters estimated in step 224 to the pre-defined group. In another embodiment, attribute aggregation program 80 applies the parameters estimated in step 234 for each subgroup to the pre-defined group. Attribute aggregation program 80 uses the applied parameters to determine group traits of the pre-defined group. For example, attribute aggregation program 80 determines, from the applied parameters, that the individual attributes with the highest distribution among the plurality of members of the pre-defined group are group traits.

In one embodiment, attribute aggregation program 80 receives a task from networking server program 70. In one embodiment, the task is associated with a group attribute. In one embodiment, attribute aggregation program 80 accesses attribute database 85. Attribute aggregation program 80 compares the group attribute associated with the task to the stored group attributes. Attribute aggregation program 80 matches the group attribute associated with the task a stored group attribute. Attribute aggregation program 80 matches the task to the pre-defined group associated with the matched group attribute.

In another embodiment, attribute aggregation program 80 uses function optimization to determine a task for the pre-defined group. Function optimization is the selection of a best element (e.g. pre-defined group), with regard to criteria (e.g. group attributes), from a set of other elements (e.g. other pre-defined groups within the networking service). For example, attribute aggregation program 80 determines that the pre-defined group includes the greatest number of expert-level C++ programmers in comparison with other pre-defined groups within the networking service. Attribute aggregation program 80 determines that a task that requires the greatest level of expertise in C++ will be assigned to the pre-defined group that includes the most C++ experts.

In another embodiment, attribute aggregation program 80 uses an unsupervised machine learning method to determine a task for the pre-defined group. For example, attribute aggregation program 80 uses cluster analysis to determine a task for the pre-defined group. Cluster analysis uses algorithms to determine pre-defined groups that share similar group traits. For example, attribute aggregation program 80 uses cluster analysis to determine pre-defined groups that include members who are experts in C++ programming. Attribute aggregation program 80 determines a task for the pre-defined groups that include members who are experts in C++ programming.

In yet another embodiment, attribute aggregation program 80 uses a supervised machine learning method to determine a task for the pre-defined group. A supervised machine learning method is a machine learning task of inferring a function from labeled training data. Training data consists training examples. Each training example is a pair consisting of an input object and a desired output value. A supervised learning algorithm analyzes the training data and produces an inferred function, which can be used for mapping new examples. For example, attribute aggregation program 80 uses a decision tree to determine a task for the pre-defined group. A decision tree is a predictive model that maps observations about a pre-defined group to a task.

In one embodiment, attribute aggregation program 80 sends an instruction to networking server program 70 to assign the determined task to the pre-defined group. In another embodiment, attribute aggregation program 80 sends the task to each member of a plurality of members of the pre-defined group at a plurality of client computers 30A-N over network 20.

Figure 3:
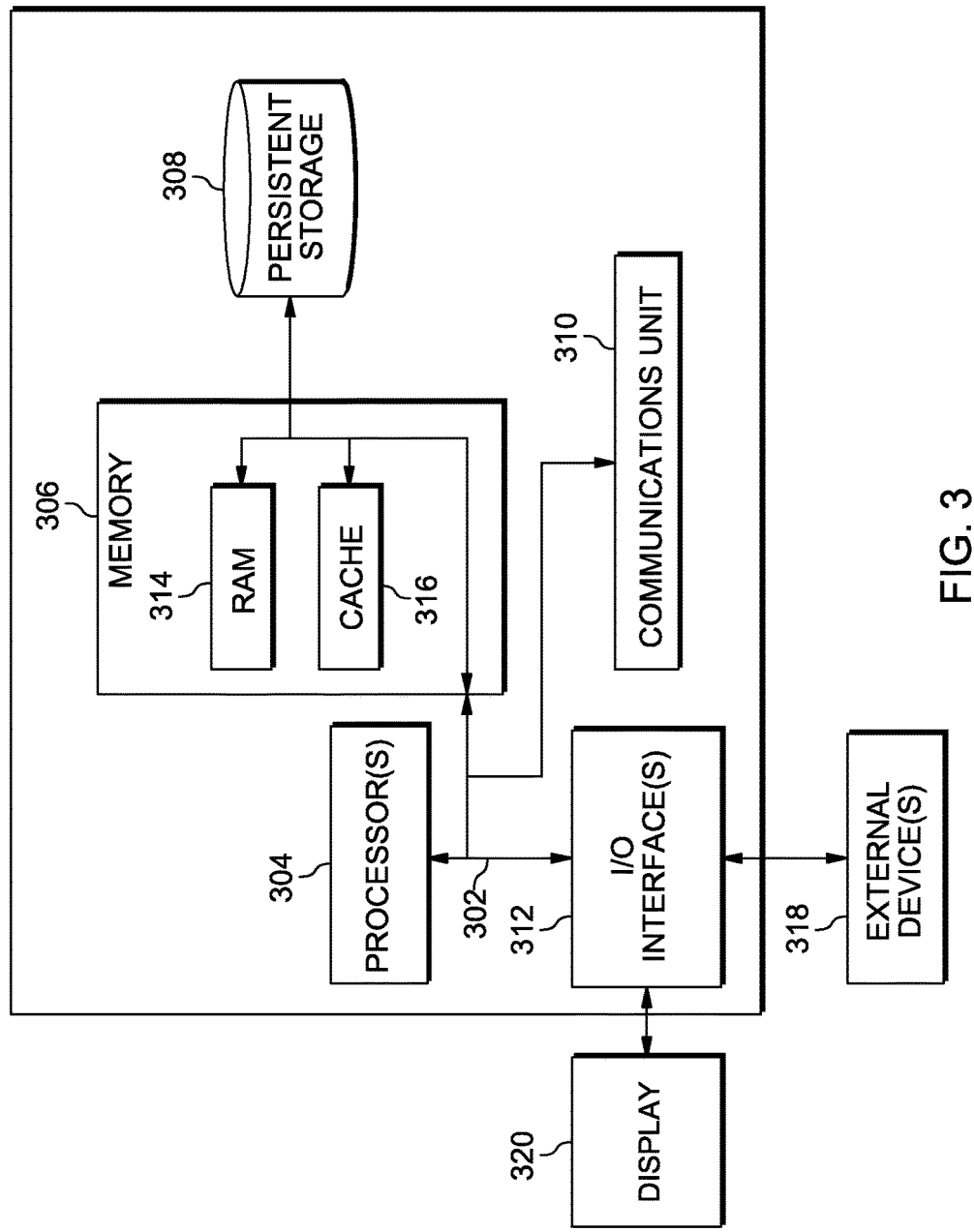
FIG. 3 depicts a block diagram of components of the server computer and the client computers of FIG. 1, in accordance with one embodiment of the present invention.

FIG. 3 depicts a block diagram of components of client computers 30A-N and server computer 40 in accordance with one embodiment of the present invention. It should be appreciated that FIG. 3 provides only an illustration of one implementation and does not imply any limitations with regard to the environments in which different embodiments may be implemented. Many modifications to the depicted environment may be made.

Client computers 30A-N and server computer 40 can each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

UI 50A-N and networking client programs 60A-N are each stored in persistent storage 308 of client computers 30A-N, respectively, for execution by one or more of the respective computer processors 304 of client computers 30A-N, respectively, via one or more memories of memory 306 of client computers 30A-N, respectively. Networking server program 70 and attribute aggregation program 80 are each stored in persistent storage 308 of server computer 40 for execution by one or more of the respective computer processors 304 of server computer 40 via one or more memories of memory 306 of server computer 40. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media capable of storing program instructions or digital information.

The media used by persistent storage 308 may also be removable. For example, a removable hard drive may be used for persistent storage 308. Other examples include optical and magnetic disks, thumb drives, and smart cards inserted into a drive for transfer onto another computer-readable storage medium that is also part of persistent storage 308.

Communications unit 310, in these examples, provides for communications with other servers or devices. In these examples, communications unit 310 includes one or more network interface cards. Communications unit 310 may provide communications through the use of either or both physical and wireless communications links. UI 50A-N and networking client programs 60A-N may be downloaded to persistent storage 308 of client computers 30A-N, respectively, through communications unit 310 of client computers 30A-N, respectively. Networking server program 70 and attribute aggregation program 80 are each stored in persistent storage 308 of server computer 40 for execution by one or more of the respective computer processors 304 of server computer 40 via one or more memories of memory 306 of server computer 40.

I/O interface(s) 312 allows for input and output of data with other devices that may be connected to client computers 30A-N or server computer 40. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., UI 50A-N and networking client programs 60A-N, can be stored on such portable computer-readable storage media and can be loaded onto persistent storage 308 of client computers 30A-N, respectively, via the respective I/O interface(s) 312 of client computers 30A-N. Software and data used to practice embodiments of the present invention, e.g. networking server program 70 and attribute aggregation program 80, can be stored on such portable computer-readable storage media and can be loaded onto persistent storage 308 of server computer 40 via I/O interface(s) 312 of server computer 40.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining group attributes and matching tasks to a group, the method comprising:
    receiving, by one or more processors of server computer hosting a social networking platform, information from a plurality of client computers, wherein each client computer of the plurality of client computers corresponds to a respective member of the social networking platform, and wherein the received information includes: (i) membership information of the social networking platform corresponding to each member, and (ii) activity information corresponding to each member's use of the social networking platform;

determining, by one or more processors of the server computer, a plurality of individual attributes for members of a first group of a plurality of groups of the social networking platform, wherein each individual attribute of the plurality of individual attributes has a type, and wherein the individual attributes of the plurality of individual attributes are determined, at least in part, from the received membership information and activity information;

estimating, by one or more processors of the server computer, one or more parameters of a first distribution of at least one type of individual attribute across members of the first group, wherein the first distribution is determined by: (i) a multivariate normal distribution, (ii) a maximum-likelihood estimation (MLE), and (iii) a parametric distribution model;

determining, by one or more processors of the server computer, one or more group attributes of the first group based, at least in part, on the one or more estimated parameters of the first distribution of at least one type of individual attribute;

storing, by one or more processors of the server computer, the one or more determined group attributes of the first group in a repository, wherein the repository includes group attributes associated with each group of the plurality of groups, including the first group;

receiving, by one or more processors of the server computer, a task, wherein the task is associated with a specific group attribute;

matching, by one or more processors of the server computer, the task to one group of the plurality of groups based on the specific group attribute and a cluster analysis; and sending, by one or more processors of the server computer, the task to the respective client computers of the respective members of the matched group.

2. The method of claim 1, further comprising:

determining, by one or more processors of the server computer, a plurality of individual attributes for members of a second group of the plurality of groups, wherein each individual attribute has a type, and wherein the individual attributes of the plurality of individual attributes for members of the second group are determined, at least in part, from the received membership information and activity information;

determining, by one or more processors of the server computer, that the second group has a number of members exceeding a pre-defined threshold;

determining, by one or more processors of the server computer, at least two subgroups of the second group;

estimating, by one or more processors of the server computer, one or more parameters of a second distribution of at least one type of individual attribute across members of the second group;

determining, by one or more processors of the server computer, one or more group attributes of each subgroup of the plurality of subgroups based, at least in part, on the one or more estimated parameters of the second distribution; and determining, by one or more processors of the server computer, group attributes of the second group based, at least in part, on the one or more determined group attributes of each subgroup of the plurality of subgroups.

3. The method of claim 2, further comprising:

storing, by one or more processors of the server computer, the one or more determined group attributes of the second group in a repository on the server computer, wherein the repository includes group attributes associated with each group of the plurality of groups including the first group and the second group;

receiving, by one or more processors of the server computer, a second task, wherein the second task is associated with a second specific group attribute; and matching, by one or more processors of the server computer, the second task to one group of the plurality of groups based, at least in part, on the second specific group attribute.

4. The method of claim 1, wherein the plurality of members of the first group includes fewer than all members of the first group.

5. The method of claim 2, wherein the plurality of subgroups of the second group each include members that have an individual attribute of a certain type.

6. The method of claim 1, wherein the plurality of members of the first group includes all members of the first group.

7. The method of claim 1, wherein estimating one or more parameters of the first determined distribution comprises estimating one or more parameters of the first determined distribution using a maximum-likelihood estimation method.

8. A computer program product for determining group attributes and matching tasks to a group, the computer program product comprising:

one or more computer readable storage media and program instructions stored on the one or more computer readable storage media, the program instructions comprising:

program instructions to receive information from a plurality of client computers, wherein each client computer of the plurality of client computers corresponds to a respective member of a social networking platform, and wherein the received information includes: (i) membership information of the social networking platform corresponding to each member, and (ii) activity information corresponding to each member's use of the social networking platform;

program instructions to determine a plurality of individual attributes for members of a first group of a plurality of groups of the social networking platform, wherein each individual attribute of the plurality of individual attributes has a type, and wherein the individual attributes of the plurality of individual attributes are determined, at least in part, from the received membership information and activity information;

program instructions to estimate one or more parameters of a first distribution of at least one type of individual attribute across members of the first group, wherein the first distribution is determined by: (i) a multivariate normal distribution, (ii) a maximum-likelihood estimation (MLE), and (iii) a parametric distribution model;

program instructions to determine one or more group attributes of the first group based, at least in part, on the one or more estimated parameters of the first distribution of at least one type of individual attribute;

program instructions to store the one or more determined group attributes of the first group in a repository, wherein the repository includes group attributes associated with each group of the plurality of groups, including the first group;

program instructions to receive a task, wherein the task is associated with a specific group attribute;

program instructions to match the task to one group of the plurality of groups based on the specific group attribute and a cluster analysis; and program instructions to send the task to the respective client computers of the respective members of the matched group.

9. The computer program product of claim 8, further comprising program instructions, stored on the one or more computer readable storage media, to:

determine a plurality of individual attributes for members of a second group of the plurality of groups, wherein each individual attribute has a type, and wherein the individual attributes of the plurality of individual attributes for members of the second group are determined, at least in part, from the received membership information and activity information;

determine that the second group has a number of members exceeding a pre-defined threshold;

determine at least two subgroups of the second group;

estimate one or more parameters of a second distribution of at least one type of individual attribute across members of the second group;

determine one or more group attributes of each subgroup of the plurality of subgroups based, at least in part, on the one or more estimated parameters of the second distribution; and determine group attributes of the second group based, at least in part, on the one or more determined group attributes of each subgroup of the plurality of subgroups.

10. The computer program product of claim 9, further comprising program instructions, stored on the one or more computer readable storage media, to:

store the one or more determined group attributes of the second group in a repository on a server computer, wherein the repository includes group attributes associated with each group of the plurality of groups including the first group and the second group;

receive a second task, wherein the second task is associated with a second specific group attribute; and match the second task to one group of the plurality of groups based, at least in part, on the second specific group attribute.

11. The computer program product of claim 8, wherein the plurality of members of the first group includes fewer than all members of the first group.

12. The computer program product of claim 9, wherein the plurality of subgroups of the second group each include members that have an individual attribute of a certain type.

13. The computer program product of claim 8, wherein the plurality of members of the first group includes all members of the first group.

14. The computer program product of claim 8, wherein estimating one or more parameters of the first determined distribution comprises estimating one or more parameters of the first determined distribution using a maximum-likelihood estimation method.

15. A computer system for determining group attributes and matching tasks to a group, the computer system comprising:

one or more computer processors, one or more computer readable storage media, and program instructions stored on the computer readable storage media for execution by at least one of the one or more processors, the program instructions comprising:

program instructions to receive information from a plurality of client computers, wherein each client computer of the plurality of client computers corresponds to a respective member of a social networking platform, and wherein the received information includes: (i) membership information of the social networking platform corresponding to each member, and (ii) activity information corresponding to each member's use of the social networking platform;

program instructions to determine a plurality of individual attributes for members of a first group of a plurality of groups of the social networking platform, wherein each individual attribute of the plurality of individual attributes has a type, and wherein the individual attributes of the plurality of individual attributes are determined, at least in part, from the received membership information and activity information;

program instructions to estimate one or more parameters of a first distribution of at least one type of individual attribute across members of the first group, wherein the first distribution is determined by: (i) a multivariate normal distribution, (ii) a maximum-likelihood estimation (MLE), and (iii) a parametric distribution model;

program instructions to determine one or more group attributes of the first group based, at least in part, on the one or more estimated parameters of the first distribution of at least one type of individual attribute;

program instructions to store the one or more determined group attributes of the first group in a repository, wherein the repository includes group attributes associated with each group of the plurality of groups, including the first group;

program instructions to receive a task, wherein the task is associated with a specific group attribute;

program instructions to match the task to one group of the plurality of groups based on the specific group attribute and a cluster analysis; and program instructions to send the task to the respective client computers of the respective members of the matched group.

16. The computer system of claim 15, further comprising program instructions, stored on the one or more computer readable storage media for execution by at least one of the one or more processors, to:

determine a plurality of individual attributes for members of a second group of the plurality of groups, wherein each individual attribute has a type, and wherein the individual attributes of the plurality of individual attributes for members of the second group are determined, at least in part, from the received membership information and activity information;

determine that the second group has a number of members exceeding a pre-defined threshold;

determine at least two subgroups of the second group;

estimate one or more parameters of a second distribution of at least one type of individual attribute across members of the second group;

determine one or more group attributes of each subgroup of the plurality of subgroups based, at least in part, on the one or more estimated parameters of the second distribution; and determine group attributes of the second group based, at least in part, on the one or more determined group attributes of each subgroup of the plurality of subgroups.

17. The computer system of claim 16, further comprising program instructions, stored on the one or more computer readable storage media for execution by at least one of the one or more processors, to:

store the one or more determined group attributes of the second group in a repository on a server computer, wherein the repository includes group attributes associated with each group of the plurality of groups including the first group and the second group;

receive a second task, wherein the second task is associated with a second specific group attribute; and match the second task to one group of the plurality of groups based, at least in part, on the second specific group attribute.

18. The computer system of claim 15, wherein the plurality of members of the first group includes all members of the first group.

19. The computer system of claim 15, wherein the plurality of members of the first group includes fewer than all members of the first group.

20. The computer system of claim 15, wherein estimating one or more parameters of the first determined distribution comprises estimating one or more parameters of the first determined distribution using a maximum-likelihood estimation method.

* * * * *